United States Patent
Kirschner

[11] Patent Number: 5,967,480
[45] Date of Patent: Oct. 19, 1999

[54] RETAINING STRAP

[75] Inventor: Kraig A. Kirschner, Corona, Calif.

[73] Assignee: Automatic Fire Control, Incorporated, South El Monte, Calif.

[21] Appl. No.: 09/203,714

[22] Filed: Dec. 2, 1998

Related U.S. Application Data

[62] Division of application No. 08/885,825, Jun. 30, 1997, Pat. No. 5,897,088, which is a continuation of application No. 08/509,871, Aug. 1, 1995, abandoned.

[51] Int. Cl.[6] .................................................. A47F 1/10
[52] U.S. Cl. ........................... 248/300; 24/563; 248/62; 248/72
[58] Field of Search ................................ 248/300, 72, 52, 248/58, 62, 49, 70, 75, 71, 73, 200, 205.1, 226.1, 343; 24/573.3, 563

[56] References Cited

U.S. PATENT DOCUMENTS

| | | | |
|---|---|---|---|
| 854,209 | 5/1907 | Goss | 248/205.1 |
| 1,394,988 | 10/1921 | Folberth | 248/226.11 |
| 1,888,265 | 11/1932 | Guthrie | 248/71 |
| 3,714,744 | 2/1973 | Koziarz | 52/28 |
| 3,920,208 | 11/1975 | Dowdy et al. | 248/72 |
| 3,931,919 | 1/1976 | Gerber et al. | 224/42.1 |
| 4,455,011 | 6/1984 | Levine | 248/646 |
| 5,295,646 | 3/1994 | Roth | 248/62 |
| 5,462,246 | 10/1995 | Schlenker | 248/49 |
| 5,472,162 | 12/1995 | Mason | 248/121 |

OTHER PUBLICATIONS

Modern Hanger & Accessories, Catalog "J", The Modern Hanger Corporation, Cleveland, OH, 1953, pp. 29–30.

*Primary Examiner*—Ramon O. Ramirez
*Attorney, Agent, or Firm*—Lyon & Lyon LLP

[57] ABSTRACT

A retaining strap for use in supplementing the securement by a C-clamp of a load carrying rod to an I-Beam in steel construction. The strap defines an arcuate slot proximate one end thereof which is adapted to be hooked about the load carrying rod such that the strap can be extended across a portion of the I-Beam and a second extended end portion of the strap bent about the I-Beam to enhance securement of the rod to the I-Beam. In a second embodiment of the invention the slot is formed in a perpendicular disposed ear portion adjacent one end of the strap which is adapted to engage a leg portion of a "U"-shaped hanger such that the strap can be extended across the hanger and the extended end bent about and secured to a second leg of a hanger for securing a fluid carrying conduit within the saddle of the hanger.

2 Claims, 2 Drawing Sheets

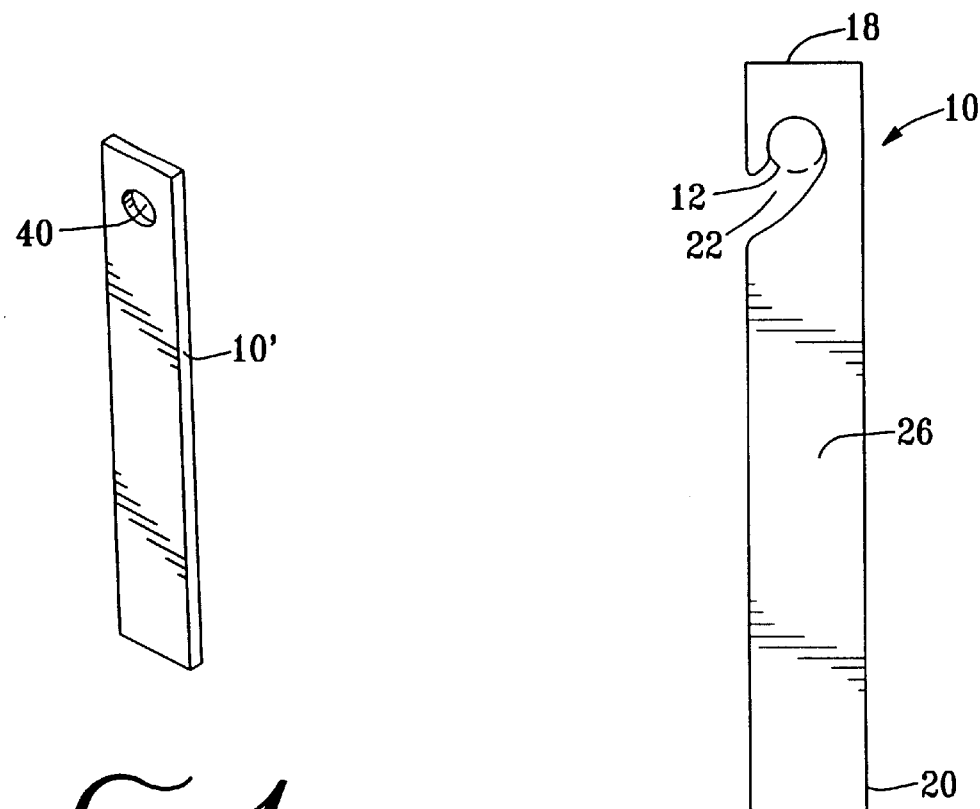
FIG. 1 PRIOR ART
FIG. 2
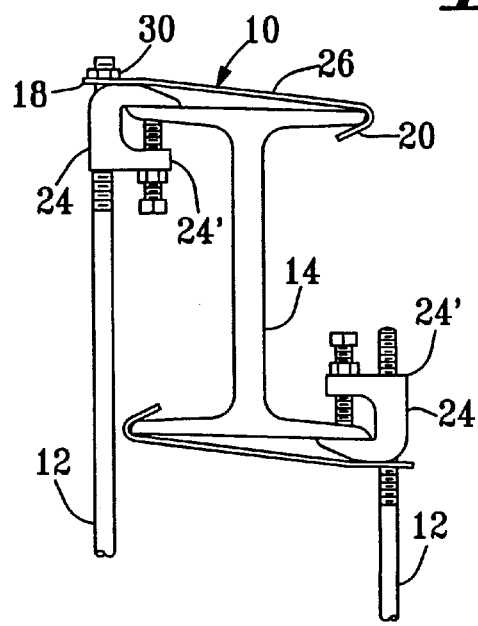
FIG. 3

RETAINING STRAP

This application is a divisional application of U.S. patent application Ser. No. 08/885,825 filed Jun. 30, 1997, now U.S. Pat. No. 5,897,088 which is a continuation of application Ser. No. 08/509,871, filed Aug. 1, 1995 (now abandoned).

BACKGROUND OF THE INVENTION

The present invention relates to a retaining strap for providing supplemental securement of a beam clamp to the beam in steel construction. It is commonplace in such construction to support fluid lines such as water pipes and gas lines as well as other loads from an I-Beam by means of a C-clamp which engages the I-Beam and carries a depending rod by means of a threaded attachment between the rod and the clamp. The load is supported by the lower end of the depending rod. Because of expansion, contraction and vibration, it is desirable to provide additional securement of the C-clamp to the I-Beam to prevent the C-clamp from working loose. This additional securement is typically provided by a metal retaining strap and is frequently required by applicable building codes. Such straps are also used in areas of high seismic activity.

The conventional configuration of retaining strap used in providing supplemental securement for beam clamps comprises a flat elongated steel member having a hole proximate one end thereof. To secure the strap in place, the load carrying rod is extended through the hole in the strap adjacent the clamp and the free end of the strap is then bent tightly about a portion of the beam. As I-Beams are frequently disposed under and against the flat surface which they support, the clamp generally must be secured to the bottom portion of the beam. Accordingly, to secure the strap in place, it is necessary to extend the load carrying rod through the hold in the strap prior to threadably engaging the rod with the clamp. The strap then extends along the lower surface of the clamp and the free end of the strap is bent tightly about a lower portion of the beam. While such a securement provides the desired additional support for the load carrying rod, its use is relatively labor intensive, particularly in retrofit applications due to the need to disengage the rod from the clamp to effect the securement of the strap. The problem becomes more acute during retrofit situations involving long water pipes which are quite heavy and can require hundreds of such securements. It would be highly desirable to provide a strap mechanism which retained the benefits of the retaining straps currently in use but which obviated the need to disengage the load carrying rods from their supporting C-clamps during installation. The strap of the present invention achieves this goal.

In a modified embodiment of the present invention, the strap provides securement of a pipe or line within a conventional "U"-shaped hanger of the type typically used in wooden construction. The stay provides such securement in retrofit applications without the need to remove the hanger or separate the hanger from the pipe or line.

SUMMARY OF THE PRESENT INVENTION

Briefly, the invention comprises a metal retaining strap adapted to be secured to and between a load supporting rod and an I-Beam wherein the rod is secured to and extends downwardly from a C-clamp carried by the beam. The strap comprises a flat elongated steel member having an arcuate slot formed adjacent one end thereof for receiving therein a portion of the supporting rod adjacent the carrying clamp such that upon disposing said one end about the rod, extending the member from the rod over the I-Beam and deforming the second end of the member about the I-Beam, the strap extends between and is rigidly affixed to the rod and the beam thereby supplementing the securement afforded by the clamp.

In a modified configuration, the strap comprises a flat elongated steel member having a flat ear portion projecting perpendicularly therefrom proximate one end of the member. The ear portion is provided with an angularly disposed slot therein adapted to receive a portion of one of the legs of a "U"-shaped hanger such that the strap can be extended from that leg across the hanger adjacent a water pipe or the gas line held in the saddle thereof. Upon deforming the extended end portion of the member about the other leg of the hanger, the strap is secured to the hanger, preventing movement of the water pipe or gas line within the hanger.

It is the principal object of the present invention to provide an improved retaining strap for securing load carrying rods from I-Beams in steel construction which supplements the conventional securement of the rod to the beam with a C-clamp and which can be secured in place for retrofit applications without the need to release the securement of the rod to the clamp.

It is another object of the present invention to provide an improved retaining strap for securing water pipes and gas lines within "U"-shaped hangers which can be secured in place for retrofit applications without the need to remove the hanger from its support or to remove the line or pipe from the hanger.

These and other objects and advantages of the present invention will become readily apparent from the following detailed description taken in conjunction with the accompanying drawings.

DETAILED DESCRIPTION OF PREFERRED EMBODIMENT

In The Drawings

FIG. 1 is perspective view of a prior art retaining strap.

FIG. 2 is a frontal plan view of a retaining strap of the present invention.

FIG. 3 is a side view showing the use of the retaining strap of the present invention to secure a pair of load supporting rods to an I-Beam.

Figure 4:
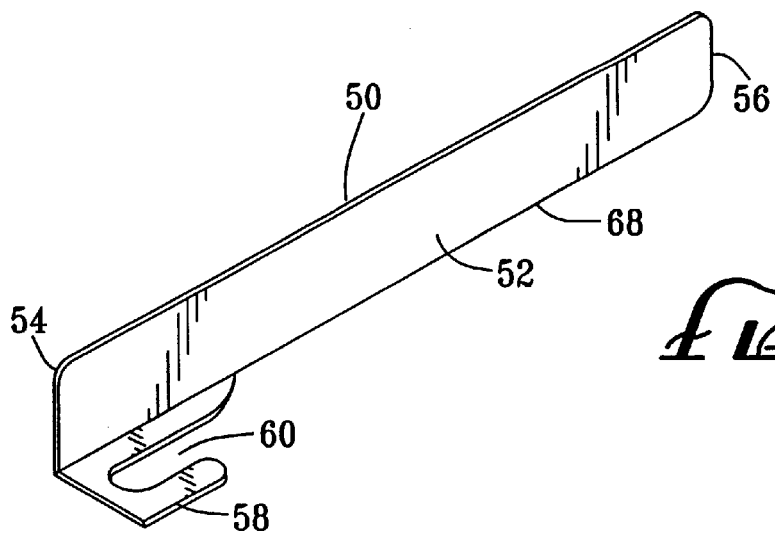
FIG. 4 is a perspective view of a modified form of the retaining strap of the present invention.

Referring now in detail to the drawings, strap 10 of the present invention is illustrated in FIG. 2 and its use supplementing the securement of load supporting rods 12 to an I-Beam 14 in steel construction is illustrated in FIG. 3. Strap 10 is preferably constructed of 16-gage carbon steel and defines a first end 18, a second end 20 and an arcuate slot 22 proximate first end 18. As seen in FIG. 3, loads such as water and gas pipes (not shown) are typically supported from an I-Beam 14 in steel construction by means of steel rods 12 and C-clamps 24. The C-clamps used in such applications are provided with a threaded aperture in the base 24' thereof which receives and supports the rod 12. Accordingly, by merely securing the C-clamp to the I-Beam and threadably engaging the clamp the load carrying rod is fixed to the I-Beam. To prevent the C-clamp from becoming loose in response to expansion, contraction and vibration of the I-Beam, strap 10 is secured between the rod 12 and I-Beam 14 as shown in FIG. 3.

To secure strap 10 in place in those applications in which the load carrying rod 12 depends from an upper portion of the I-Beam 14, it is solely necessary to "hook" the first end 18 of strap 10 about rod 12 such that a portion of the rod is received within the slot 22, pull the body portion 26 of strap 10 across the upper portion of the I-Beam and bend the extended end 20 about the I-Beam as seen in the upper portion of FIG. 3. A nut 30 can then be threadedly engaged with rod 12 above C-clamp 24. Thus, strap 10 can be secured in place without the need in any way to interrupt the threaded engagement of rod 12 with C-clamp 24 which is highly significant in retrofit applications wherein a large heavy load is being carried by rod 12. The strap 10 can be similarly secured in place to augment the securement of a supporting rod to the lower portion of an I-Beam as is also illustrated in FIG. 3. Again, this securement can be made without the need to in any way to interrupt the securement of the rod to the C-clamp. In contrast, when using the prior art illustrated in FIG. 1, it is necessary to actually extend the supporting rod through the aperture 40 in the strap 10'. This does not present any problem when hanging the supporting rods from the upper end of the I-Beam as is seen in the upper portion of FIG. 3. However, it is frequently necessary to support the rod 12 from the lower portion of the I-Beam as seen in the lower right hand portion of FIG. 3. In those applications, it is necessary first to threadably disengage the support rod 12 from the I-Beam 14 and then insert the threaded portion of the rod through the aperture in the prior art strap and resecure the rod 12 to the C-clamp 24. Such an operation is labor intensive in retrofit applications when a heavy load is being carried by the rod 12. With the strap 10 of the present invention, however, the first end of the strap can merely be hooked about the supporting rod 12, obviating the need to disengage the rod from the C-clamp to effect securement of the strap between the rod and the lower portion of the I-Beam.

Figure 5:
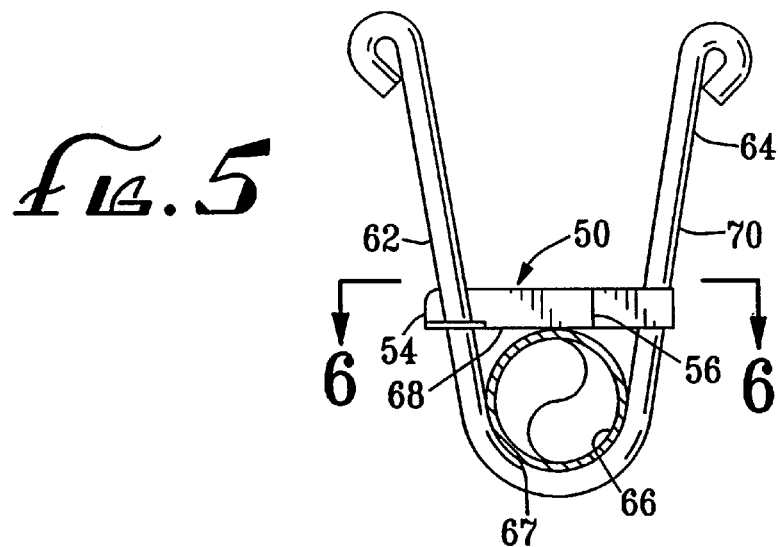
FIG. 5 is an end view showing the use of the modified form of the retaining strap of the present invention to secure a water pipe in a "U"-shaped hanger.
Figure 6:
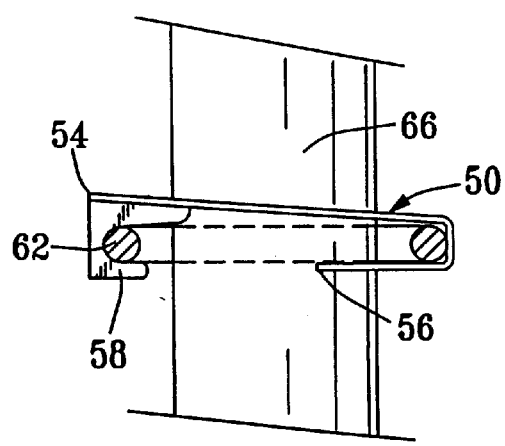
FIG. 6 is a sectional view taken along the line 6—6 in FIG. 5.

A modified form of the invention for use with "U"-shaped hangers is illustrated in FIGS. 4–6. The modified strap 50 shown therein is preferably constructed of 16-gauge carbon steel and defines a flat body portion 52 having a first end 54, a second end 56 and a flat ear portion 58 extending perpendicularly from body portion 52 proximate first end 54. Ear portion 58 defines a slot 60 therein which extends parallel to body portion 52 and is adapted to receive a portion of one of the legs of a "U"-shaped hanger 64. Strap 50 can be used with hangers having inclined leg portions such as hanger 64 shown in the drawings or with hangers having vertically extending parallel leg portions.

To secure retaining strap 50 in place on hanger 64 so as to prevent movement of a water pipe or gas line 66 held in the saddle 67 of hanger 64, the strap is first hooked about a portion of hanger leg 62 so that the leg is disposed within slot 60. The strap is then pulled across the hanger adjacent the pipe or line 66 such that the lower edge 68 of the body portion 52 of the strap abuts the pipe, whereupon the second extended end 56 of the strap is bent about the second leg 70 of hanger 64 as seen in FIGS. 5 and 6, securing the strap in place adjacent the water pipe or gas line within the saddle 67 of hanger 64. Thus, strap 50, like strap 10 of the prior embodiment can be secured in place for retrofit applications without the need to disassemble the previously secured apparatus by which the load is held in place.

Various changes and modifications may be made in carrying out the present invention without departing from the spirit and scope thereof. Insofar as these changes and modifications are within the purview of the appended claims, they are to be considered as part of the present invention.

I claim:

1. A retaining strap for supplementing the securement of a fluid carrying conduit to a fixed structure by means of a "U"-shaped hanger of the type having spaced leg portions, said retaining strap comprising a flat steel member having a first end portion, a second end portion, opposed longitudinal edges, an ear portion disposed adjacent said first end portion and extending perpendicularly therefrom, and a slot disposed in said ear portion, said slot defining an open end and a closed end and extending from said open end to said closed end in the direction of said first end portion in a direction substantially parallel to said member such that a traverse portion of one of the legs of the hanger can be slotably inserted therein and wherein said second end portion of said member is bendable about a second leg of the hanger upon said transverse portion of said first leg being disposed within said slot, whereby the strap is secured to and between the legs of the hanger such that one of the edges of the strap is disposed adjacent the conduit within the hanger thereby supplementing the securement of the conduit within the hanger.

2. A retaining strap and clamp assembly for use in securing a fluid carrying conduit to a fixed structure, said assembly comprising a "U"-shaped hanger having a saddle portion adapted to receive the conduit and a pair of upstanding leg portions, said strap comprising a flat steel member having a first end portion, a second end portion, opposed longitudinal edges, an ear portion disposed adjacent said first end portion and extending perpendicularly therefrom, and a slot disposed in said ear portion, said slot defining an open end and a closed end and extending from said open end in the direction of said first end portion to said closed end in a direction substantially parallel to said member such that a traverse portion of one of the legs of the hanger can be slotably inserted therein and wherein said second end portion of said member is bendable about a second leg of the hanger upon said transverse portion of said first leg being disposed within said slot, whereby the strap is secured to and between the legs of the hanger such that one of the edges of the strap is disposed adjacent the conduit within the hanger thereby supplementing the securement of the conduit within the hanger.

\* \* \* \* \*